Sept. 13, 1927.   T. HAIGHT   1,642,023
STEAM TRAP
Filed May 13, 1925
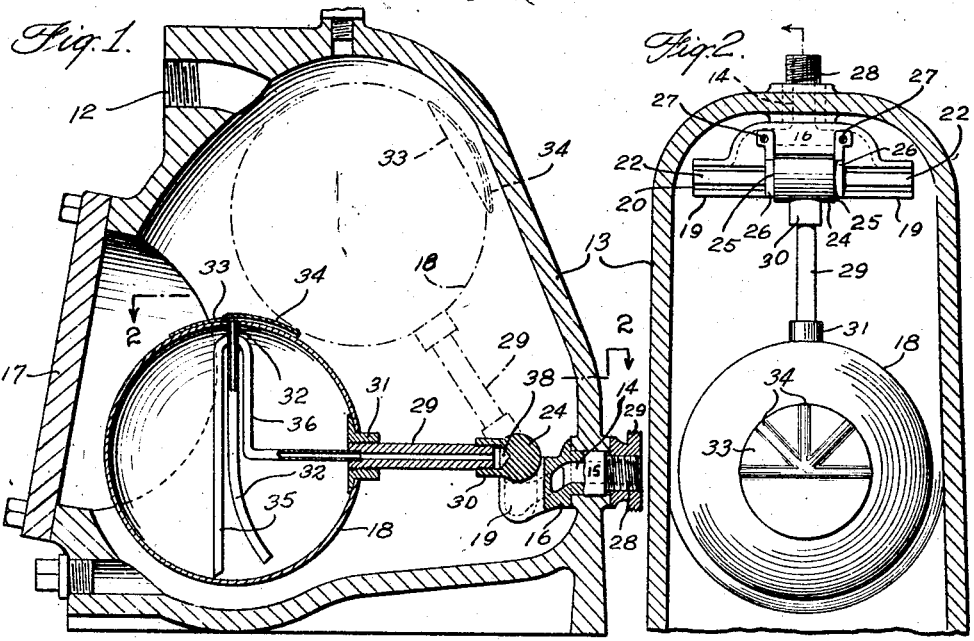
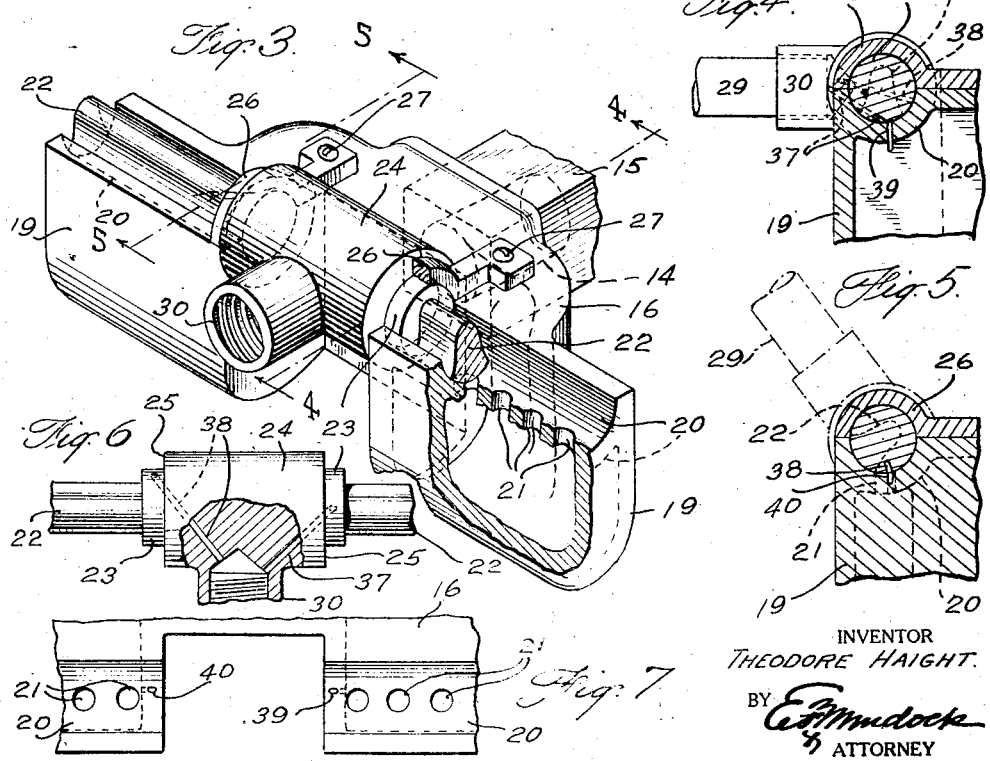
INVENTOR
THEODORE HAIGHT.
BY E. Murdock
ATTORNEY Patented Sept. 13, 1927.

1,642,023

UNITED STATES PATENT OFFICE.

THEODORE HAIGHT, OF BROOKLYN, NEW YORK.

STEAM TRAP.

Application filed May 13, 1925. Serial No. 29,942.

Among the principal objects which the present invention has in view are: to avoid the temporary incapacity to which traps of the general character herein indicated are at the present subjected; to prevent waters of condensation gaining access to the float member of the apparatus thereby waterlogging the same; to eliminate condensates of any character which may gain access to the float member; to avoid frictional interference with the operation of the apparatus; to expel from the apparatus, and particularly from the float member thereof, dead air and deleterious gases; to readily and quickly remove or replace the working parts of the apparatus; to preserve the alinement of the assembled parts; to avoid collapsing the float member by the pressure within the trap; and to simplify and cheapen the construction.

Drawings.

Figure 1 is a vertical longitudinal section of a trap constructed and arranged in accordance with the present invention.

Figure 2 is a horizontal section of the same, the section being taken as on the line 2—2 in Fig. 1.

Figure 3 is a perspective view of the valve and seat therefor by which the delivery from the trap is controlled.

Figure 4 is a detailed view in section showing a fragment of the valve and mounting therefor, the view being taken as on the line 4—4 in Fig. 3. In this view the supporting arm of the float member is shown in its lowered position.

Figure 5 is a sectional view in detail, the section being taken as on the line 5—5 in Fig. 3, the supporting arm for the float member being shown in broken lines and in the raised position.

Figure 6 is a detail view showing fragments of the valve and of the connecting body therefor, a part of said body being cut away to show the interior construction thereof.

Figure 7 is a detailed view showing a fragment of the valve seat.

Description.

In the accompanying drawings, the invention is disclosed as embodied in a steam trap for a drainage system, and to this end the inlet 12 is threaded to receive the drainage pipe while the outlet of the trap 13 is provided in the passage 14 formed in the rectangular extension 15 of the hollowed valve seat body 16. This construction is best shown in Figures 1 and 3 of the drawings. A hand hole is normally closed by a cover 17 which as shown is bolted in place. The hand hole referred to is made sufficiently large to pass the hollow globe 18 which constitutes the float member of the apparatus, also the valve seat body 16 and the hollow extensions 19 thereof, can be passed through this opening. This is arranged in this manner so that the valve operating mechanism can be withdrawn or inserted at will, by the removal of the cover 17.

The valve mechanism consists primarily of valve seats 20 formed in the extensions 19. The seats 20 have a series of perforations 21. The seats are semi-cylindrical to form bearings for segmental valve rods 22 and the supporting gudgeons 23 extended from the connecting and spacing body 24. The gudgeons 23 are extended from the ends of the space body, the ends whereof are machined to form guide shoulders 25. The shoulders 25 fit neatly between the inner ends of the extensions 19 and form in conjunction therewith a guide for the operation of the body 24 and the valve rods 22 connected therewith. The valve rods 22 have a curved edge which is concentric and coincident with the gudgeons 23. The valve rods 22 are adapted to close completely the perforations 21 when the space body 24 is disposed in the position shown in Fig. 1 and Fig. 3 of the drawings.

The valve members are held upon their seats by clips 26 which are shaped to fit over the gudgeons 23 to retain the same and parts connected therewith in service position. The screws 27 or other suitable devices are employed for holding the clips 26 in service.

The rectangular extension 15 is inserted from the inside of the receptacle 13 through a squared opening in the trap body. An extended end 28 is threaded to receive a pipe coupling 29, which when set up against the side of the receptacle 13, draws the extension 15 firmly in the perforation. It will be noted that the opening thus formed in the trap will be firmly and completely closed if properly machined or otherwise treated will render the joint steam-tight.

By reference to Figures 1 and 3 of the drawings it will be seen, the extensions 19 and body 16 are hollow and communicate with the delivery outlet 14, therefore, it is obvious that when the valve rods 22 are moved to expose the perforations 21, any water or other liquid contained in the receptacle 13, the level of which is above the perforations 21, will escape through the said perforations, extension 19, and body 16, to the outlet 14. To accomplish this, however, the valve rods 22 must be moved to expose the perforations 21. This is the office of the globe 18.

The globe 18 is preferably constructed of copper, brass or other suitable material, preferably non-corrodible. It is operatively connected with the spacing body 24 by the tubular arm 29, the ends of which are threaded to engage the threads in the extension 30, with which the body 24 is provided, and the nipple 31 extended from the globe 18.

The globe 18 is floated by any water of condensation which gains admission to the receptacle 13. When in the position shown by full lines in Figure 1 of the drawing, the valve rods 22 are disposed as shown in Figure 3 of the drawings, and steam which may have found admission to the trap is prevented from passing therefrom by way of the hollow extensions 19 and the passage 14. In this manner the steam pressure in the receptacle 13 is maintained substantially equal to the pressure on the main. When, however, the globe is lifted to a position approximately that shown by broken lines in Fig. 1, the valve rods 22 are disposed in substantially the position shown in Fig. 5 of the drawings, where the perforations 21 are exposed. In this position the water contained in the receptacle 13 is rapidly driven off, the pressure of steam within the trap aiding in this evacuation. As the water recedes, the globe 18 descends from the position shown by broken lines in Fig. 1 to that shown by full lines in said figure, thereby closing the perforations 21 by means of the valve rods 22.

Heretofore, difficulty has been experienced by the globes 18 collapsing under steam pressure, or for other causes, such as a too sudden lift of the globe striking against the side of the trap to dent or destroy the globular shape of the walls and thereby rendering the same sensitive and liable to collapse. To avoid this I have placed in the globe a pipe 32 by means of which steam can enter from the body of the receptacle 13 within the globe 18. By thus equalizing the pressures internally and externally the globe is prevented from collapsing.

A shield 33 is mounted on the globe 18 as seen best in Figures 1 and 2 of the drawings. The shield may be constructed in any suitable manner. I prefer one having the raised ridges 34 which form steam passageways for the steam leading to the pipe 32. It will be noticed that the passageways thus formed, open away from the inlet 12 and thus provide for avoiding the admission of water which may enter or flow off the globe 18 from the said inlet.

From the foregoing it will be seen that the difficulties heretofore experienced from the collapsing of the float members, with the consequent loss of flotation, is avoided. Also it will be noted that by reason of the rectangular extension 15 and the receiving orifice provided in the body of the tank therefor, and the perfect alinement secured for the globe by means of the spacing body 24, and the inner ends of the extensions 19, the globe 18 is held from striking the sides of the receptacle 13 in the oscillations of the globe when functioning.

As steam enters the globe 18 and is brought in contact with the relatively cooler surface which is immersed in the water held in the trap, it naturally condenses. It is to remove this water of condensation from the globe 18 and thereby maintain the buoyancy of the said globe that I employ the pipe 35. The pipe 35 has a vertical loop, the upper or looped end of which is held adjacent the pipe 32 at the normal top of the globe. The short leg of the loop 36 has a horizontal extension which is fitted into the globe spud 31, which engages the arm 29, the passages in both the arm 29 and the pipe 35 registering and being in open communication.

The spacing body 24 and the extension 30 thereof, are bored and threaded to receive the arm 29. At the lower end of the bore, two passages indicated by the numerals 37 and 38 respectively, are drilled through the said body and the gudgeons 23 thereof. These passages 37 and 38 when operatively disposed, register with passages 39 and 40 in the valve seats 20 and particularly the portion thereof which form the bearings for the gudgeons 23. As shown in Figures 4 and 5 of the drawings, the passages 37 and 38 register with the passages 39 and 40, respectively, when the arm 29 is in the lowered and the lifted positions, respectively.

When the globe 18 is disposed as shown in Figure 1 of the drawings, the passage 37 is registered with the passage 39. Any water now contained in the said globe is under pressure of the steam in the receptacle 13 and globe. This pressure lifts the water through the pipe 35 and the loop 36 driving the same therethrough into the arm 29 and through the passages 37 and 39 to the interior of one of the extensions 19 from whence the water escapes through the outlet 14. It is to prevent the receiving end of the pipe 35 becoming closed that I have cut the same on an angle as shown in the drawings. In this manner the flotation of the globe is automatically maintained.

It sometimes happens that air and incondensible gases become trapped within the float and interfere with the proper functioning thereof. The purpose of the passages 38 and 40 is to permit the same to pass from the globe 18 when the said passages are in registry. This occurs when the globe is in the elevated position shown by broken lines in Fig. 1. The said gases co-mingling with the steam are carried through the pipe 35, loop 36, pipe 29 and passages 38 and 40 into the interior of the extension 19 which it will be seen at this time is filled with flowing water entering through the perforations 21. The air, gases and steam enter the body of the water and are carried thereby through the outlet 14.

In this manner the accumulation of undesirable gases in the float member or globe 18 is prevented.

It is obvious that if at any time it becomes necessary to remove the float member and the valve mechanism associated therewith, this is easily accomplished by removing the cover 17—the steam supply having of course been first cut off—and removing the clips 26, the globe 18, spacing body 24, and rods 22, may be simply removed by lifting the rods 22 from their seat. It is obvious that the replacement or renewal of the parts is as usually effected. By introducing steam or air through the pipe 32 into the globe 18, provision is made for preventing the flooding or waterlogging of the globe. The delivery end of the pipe 32 being juxtaposed as shown in the drawings to the bottom of the globe, any water of condensation or immersion rising above the delivery end of the said pipe must necessarily trap any steam, air or gas in the globe. When the pressure of the water in the globe and on the trapped air or steam equals the pressure of the steam in the trap, the introduction of water must cease as the two forces equalize. In this condition, however, there is always sufficient buoyancy to the globe to float, and in this manner there is avoided any possibility of "drowning" or flooding the globe to impair its buoyancy.

*Claims.*

1. A steam trap comprising a receptacle for condensed liquid in open communication with a supply of pressure medium; a valve member for controlling an outlet from said receptacle; operating means for said valve member, said means embodying a thin walled flotation member operable in the presence of said pressure supply, means for limiting the quantity of moisture to be admitted to the flotation member, and means for admitting said pressure supply to the interior for equalizing the pressure on the walls of said flotation member, said means embodying an inlet pipe extending from the top of said flotation member to near the bottom thereof, said inlet pipe being shaped in correspondence with the path of movement of said flotation member.

2. A steam trap comprising a receptacle for condensed liquid in open communication with a supply of pressure medium; a valve member for controlling an outlet from said receptacle; and operating means for said valve member, said means embodying a thin walled flotation member operable in the presence of said pressure supply, said pressure supply being admitted to the interior for equalizing the pressure on the walls of said flotation member; and means for eliminating any liquid from said flotation member, said means embodying a tubular member adapted to be placed in open communication with the outlet from said receptacle and having a vertically disposed loop, the lower end of which is held adjacent the lowermost portion of said flotation member, while the upper end of which is disposed adjacent the uppermost portion of said flotation member, and registering passages, one associated with, to be moved in unison with said flotation member, and the other in the valve seat for delivery to said outlet when said flotation member is in its lowered position.

THEODORE HAIGHT.